May 21, 1957 — T. PAUL — 2,792,966
POTATO AND LIKE SEED PLANTING MACHINES
Filed Feb. 18, 1953 — 3 Sheets-Sheet 1

INVENTOR.
Tadeusz Paul,
BY B. Pelechowicz
Atty.

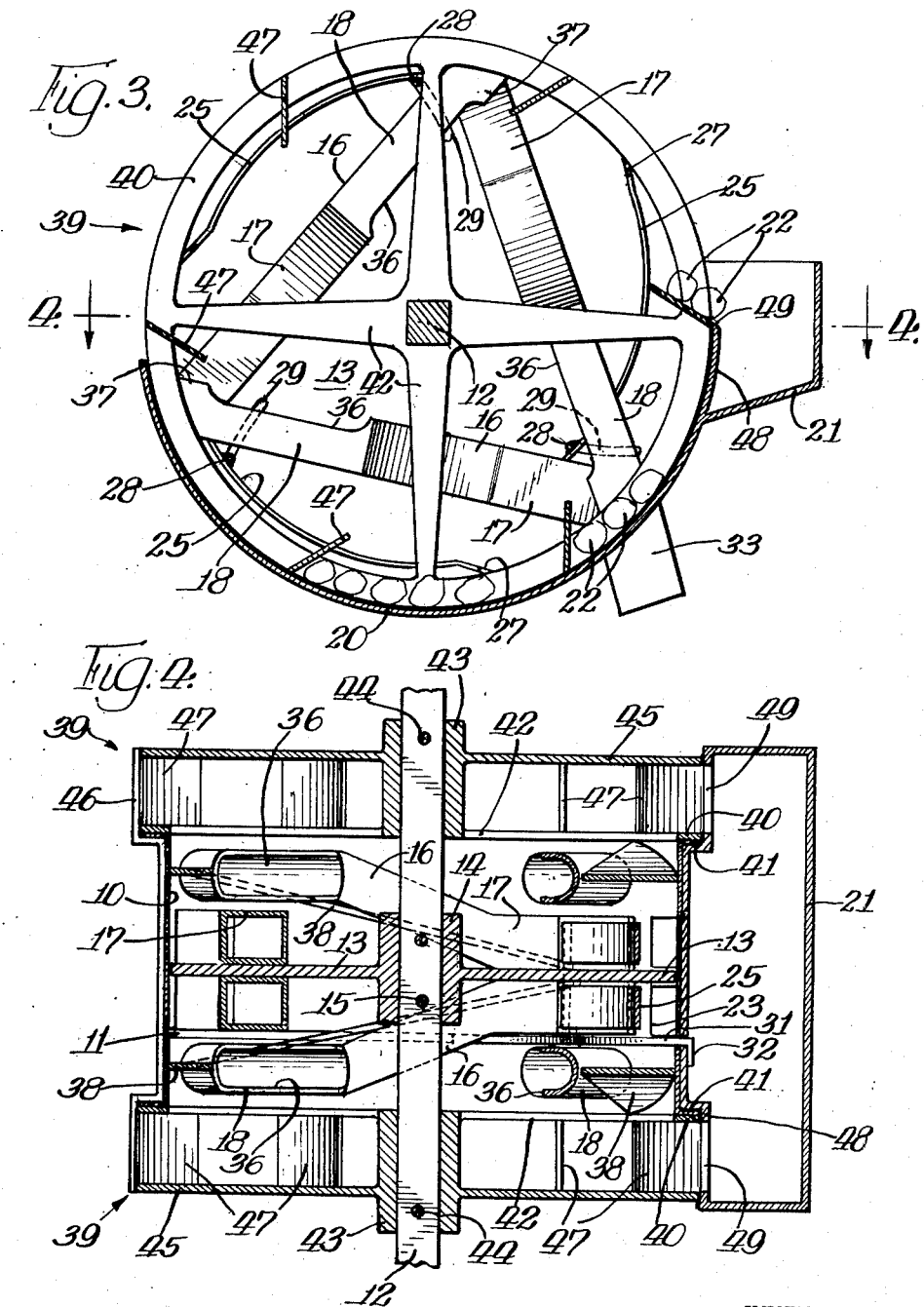

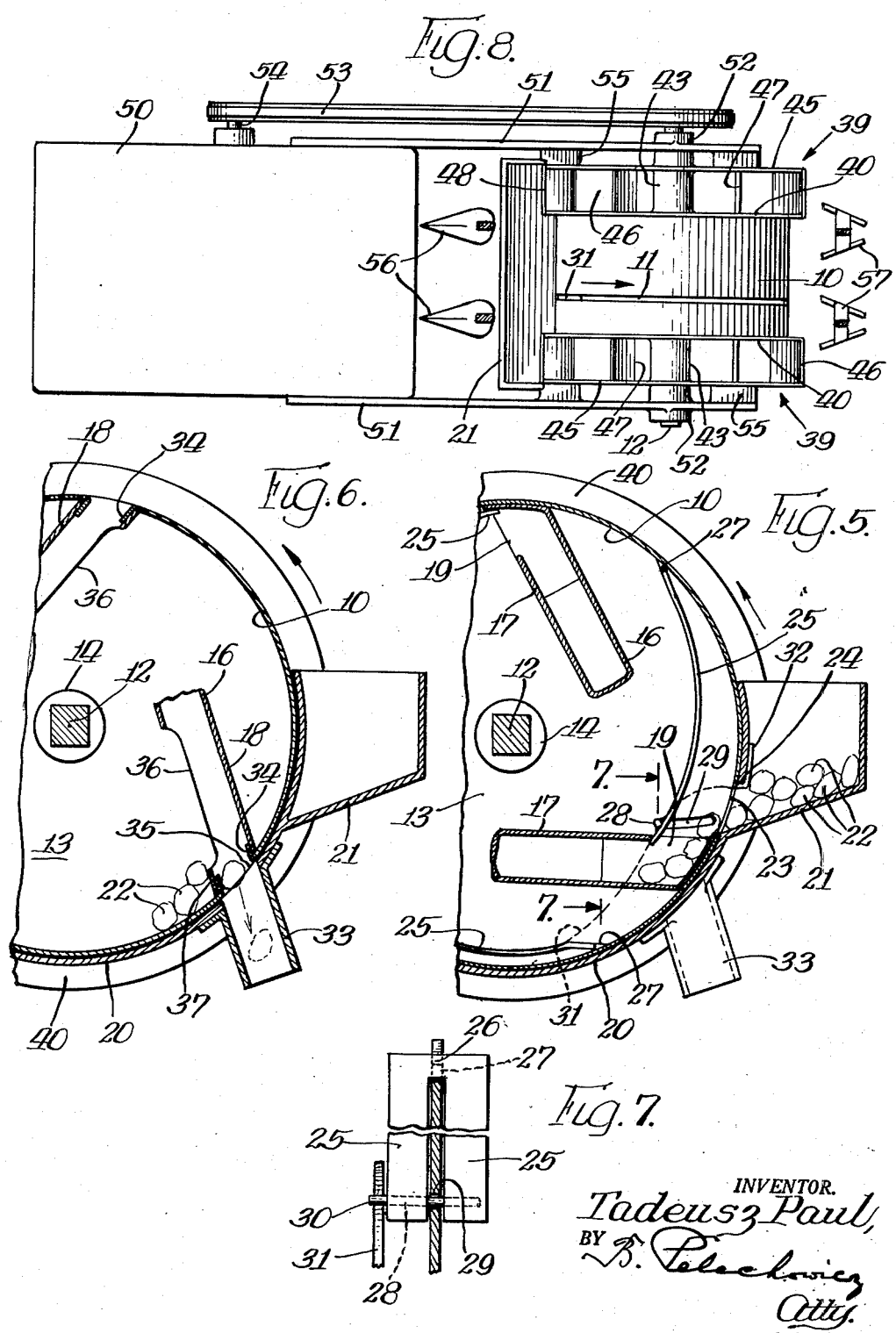

United States Patent Office 2,792,966
Patented May 21, 1957

2,792,966

POTATO AND LIKE SEED PLANTING MACHINES

Tadeusz Paul, Chicago, Ill.

Application February 18, 1953, Serial No. 337,490

4 Claims. (Cl. 221—174)

The present invention relates to potato and like seed planting machines.

The principal object of the invention is the provision of a machine for planting potatoes or the like embodying in its essential features a chute open at both of its ends, with means to deposit potatoes into the chute through one of its ends, and for ejecting the potatoes through the opposite end of the chute as the chute turns.

A still further object of the present invention is the provision in the machine of the character indicated of a revolving chute having both ends open, with a potato-storing hopper for supplying potatoes into the chute through one of its ends as that end shifts past the hopper, with an ejecting tube to receive potatoes from the opposite end of the chute as that latter end shifts past said ejecting tube.

Another object of the present invention is the provision of a machine for planting potatoes or the like embodying a rotatable drum, one or more open-ended chutes supported in said drum for movement therewith, a hopper for delivering potatoes to one end of each chute as such end moves past the hopper, means for delivering all potatoes except a predetermined number from each chute into the drum, and an ejecting tube for receiving the predetermined number of potatoes from the opposite end of each chute as such end moves past said ejecting tube, each chute being of a zigzag formation so that the potato-receiving ends therein may be upon circle of the drum, while the potato-ejecting ends of the chutes may remain upon another circle of the drum.

With the above general objects in view and others that will appear as the invention is better understood, the same consists in the novel construction, combination and arrangement of parts hereinafter more fully described, illustrated in the accompanying drawings and pointed out in the appended claims.

In the drawings forming a part of this application, and in which like designating characters refer to corresponding parts throughout the several views:

Fig. 3 is a cross sectional view on line 3—3 of Fig. 1, more particularly illustrating the mechanism for carrying back into the hopper the excess of potatoes which have been thrown off from the chutes into the drum;

Fig. 4 is a cross sectional view on line 4—4 of Fig. 3;

Fig. 5 is a transverse cross sectional view through the hopper and the drum illustrating the mechanism for supplying potatoes from the former into the chute;

Fig. 6 is a cross sectional view through the drum more particularly illustrating the means for ridding of potatoes in excess of one or of any other predetermined number in the chute, with means for passing the retained potato or potatoes from the chute into the ejecting tube;

Figure 1:
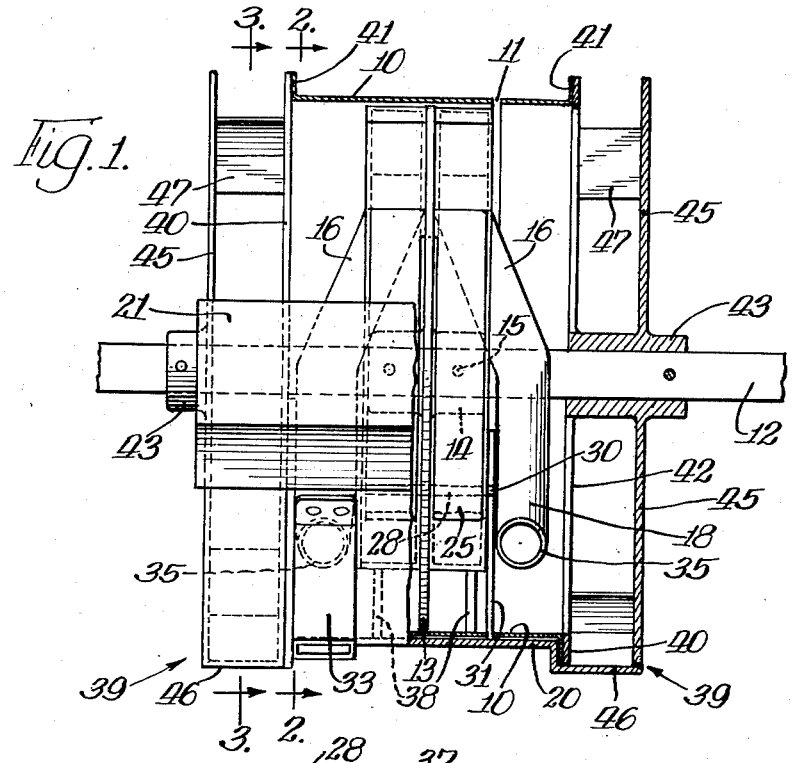
Fig. 1 is a side elevational view, partly in section of the present potato planter, including a drum, a plurality of chutes which revolve bodily with the drum as the latter rotates, a hopper from which potatoes are supplied to the chutes through one of the ends of the latter, and ejecting tubes through which potatoes are ejected through the opposite ends of the chutes as said hopper rotates.

Fig. 7 is a cross sectional view on line 7—7 of Fig. 5, more particularly illustrating the cam-actuable closure at the potato-receiving end of the chute as that end approaches the hopper during the rotation of the drum; and Fig. 8 is a top elevational view, of a diagrammatical nature, of the present device in association with a tractor or a like machine, ditch-making plows ahead of the present device for making ditches into which the potatoes are deposited as the same are released by the ejecting tube, with another set of plows or levelers past the machine for covering the ditches and the planted potatoes with earth.

Referring in detail to the present drawings there is shown therein drum 10, provided with a circumferential recess 11 which divides the drum into longer and shorter sections. The purpose of said recess 11 will be hereinafter described. In an axial relation with said drum 10 is shaft 12 which is of square formation in transverse cross section. Positioned within said drum 10 in a transverse relation is disk 13, which is provided with central collar 14, which is rigidly affixed to said shaft 12 by means of pins 15.

Affixed on each side of disk 13 is a plurality of chutes 16. As shown in the drawings there are three chutes 16 on each side of disk 13. Said chutes on both sides of said disk 13 are arranged in pairs in a symmetrical relation. Each of said chutes 16 has a receiving end 17 and discharging end 18. The opposed pairs of chutes 16 are affixed by their receiving ends 17 to said disk 13, as is clearly seen in Fig. 4. At their central portions said chutes 16 diverge from disk 13, and the discharging ends 18 of the chutes are in a spaced relation with said disk 13, as is clearly seen in Figs. 1 and 4. The receiving ends 17 of the chutes are in an offset relation with the discharging ends 18 of the chutes in a transverse relation through the chutes, or in a longitudinal relation with drum 10, as is clearly seen in Figs. 2, 3 and 4. By virtue of the arrangement described the receiving ends of the chutes on each side of disk 13 are located upon a pair of circles transversely of drum 10, one adjacent each side of disk 13, while the discharging ends 18 of the chutes are located upon a pair of circles, one on each side of disk 13, farther removed from said disk 13, as is clearly seen from Figs. 1 and 4.

The receiving end 17 of each chute, adjacent its termination and in the immediate proximity of the wall of drum 10, and upon its face which is nearest to shaft 12 is provided with opening 19. Said opening 19 assumes a horizontal position as chute 16 has assumed its horizontal position during the rotary movement of drum 10 and the bodily revolving movement therewith of said chutes 16, as is clearly seen in Fig. 5.

Rigidly supported upon semi-annular plate 20, which remains in contact with the lower peripheral portion of drum 10 is hopper 21 receiving therewithin a quantity of potatoes 22.

Just above openings 19 in the several pairs of chutes 16 drum 10 is provided with openings 23, which periodically come in alinement with a pair of openings 24 made adjacent the lower end of hopper 21 and upon its wall which remains in contact with the periphery of drum 10, as is seen in Fig. 5. As the drum rotates in the direction indicated by arrow in Fig. 5 the several pairs of openings 23 in drum 10 periodically come in register with openings 24 in hopper 21 for the purpose of releasing through said registered openings 23 and 24 a quantity, perhaps two or three, potatoes, which fall within each opening 19 in a pair of chutes 16, one on each side of disk 13, as said chutes periodically approach hopper 21, such condition being seen in Fig. 5.

Coacting with the receiving ends 17 of a pair of oppositely disposed chutes 16, that is each on one side of disk 13, is a pair of oblong leaf springs 25, which at one of their ends are connected by a transverse strip 26 which enters slot 27 made in the rim of disk 13, for anchoring the ends of said leaf springs 25 to disk 13. There are of course three pairs of said leaf springs 25, each pair coacting with the receiving ends 17 of a pair of opposed chutes 16.

The lower ends of each pair of said springs 25, on their inner surfaces, carry in a rigidly affixed relation rod 28, which by its portion intermediately of a pair of coacting leaf springs 25 is located for shifting movement within arcuate slot 29 made in disk 13 and adjacent each opening 19 in the receiving end of chute 16. One end of said rod 28 extends beyond the outer edge of one of said leaf springs 25 in each pair thereof, as at 30. Said projecting end 30 of rod 28 comes periodically in contact with the inner edge of cam 31 as said drum 10 rotates. The upper end of said cam 31 is provided with hook 32 by means of which the cam is engaged with the inner face of the inner wall of hopper 21, and is extended thereto through opening 24, all for maintaining said cam 31 in a rigid stationary relation with said hopper 21.

Said cam 31 extends into drum 10 through recess 11, remaining within said recess 11 during the rotary shifting movement of the two sections of said drum 10, without any interference therewith.

Normally the moving ends of each pair of leaf springs 25, extending into the receiving ends of chutes 16 through openings 19, contact with the end walls of the receiving ends of said chutes 16, as is clearly seen in the upper end of Fig. 5. Of course, normally said leaf springs 25 are disposed adjacent the rim of disk 13 due to the inherent flexing urge of said springs 25 towards the drum wall 10, as is clearly seen in Fig. 2. By virtue of this action of springs 25 openings 19 are normally shielded from the inner periphery of drum 10. As during the normal operation of said drum 10 with the normal bodily revolving therewith of the several pairs of chutes 16, the receiving ends of said chutes 16 approach hopper 21, or more specifically the openings 24 in its inner wall, cam 31 comes in contact with the projecting end 30 of rod 28. The contact of said projecting end 30 of rod 28 commences with the inner edge of the lowermost end of cam 31 as said drum rotates in the direction of arrows in Figs. 2 and 5, causing gradual opening of openings 19 by the movable ends of leaf springs 25. This cam action causes the central portion of rod 28 to shift to the opposite end of slot 29, that is the end nearest to the center of disk 13. When said openings 19 are immediately below openings 24 in the inner wall of hopper 21 cam 31 has shifted the pair of cooperating leaf springs 25 to the farthermost extent, as is clearly shown in Fig. 5, completely exposing said openings 19, permitting full communication of said openings 19 with openings 23 in drum 10 and openings 24 in the inner wall of hopper 21.

Figure 2:
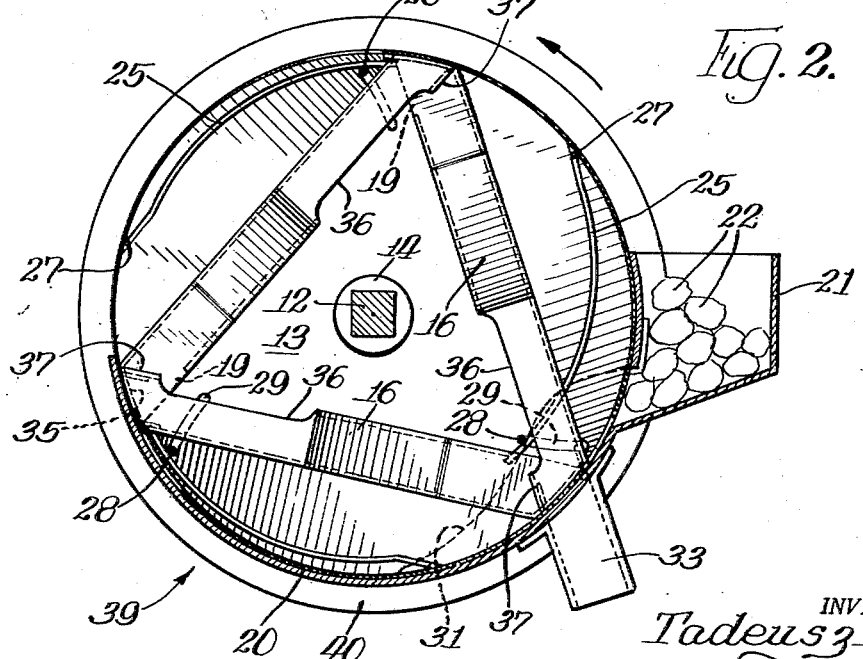
Fig. 2 is a cross sectional view on line 2—2 of Fig. 1.

As drum 10 continues to rotate the projecting end 30 of rod 28 rides upon the operative edge of cam 31 adjacent the upper end of the latter, permitting said rod to shift toward the wall of drum 10, causing the pair of said leaf springs 25 to fall back into their normal inoperative position, adjacent the rim of disk 13, as is seen in Figs. 2 and 5. Simultaneously opening 24 in hopper 21 is shut off by the wall of drum 10 immediately below openings 23 shutting off completely the flow of potatoes through said openings 24 into drum 10 or into the receiving ends of chutes 16.

By the operation last hereinabove described a number of potatoes has found itself within the receiving ends of a pair of opposed chutes 16, as is seen in Fig. 5. Further shifting of drum 10 will gradually elevate the receiving ends of chutes 16, with the number of potatoes therewithin, causing said potatoes, due to the gravity to ride the outermost walls of the pair of opposed chutes 16 until the potatoes have shifted within the discharging ends 18 of chutes 16, until eventually said discharging ends of each pair of opposed chutes 16 assume the discharging position illustrated in Fig. 6.

Rigidly affixed to said semi-annular plate 20 is a pair of potato-ejecting tubes 33 which remain on planes coincidental with the circle of drum 10 upon which said discharging ends 18 of chutes 16 are located.

Plate 20 is of course provided with an opening in communication with each of said ejecting tubes 33 as is clearly seen in Fig. 6.

The outer termination of the discharging end of each of said chutes 16 is rigidly affixed to the wall of drum 10 through the medium of inwardly directed overlapping lips 34, which effect openings 35 in the wall of drum 10, in communication with the discharging ends of said chutes 16, as is clearly seen in Fig. 6.

The discharging end 18 of each chute 16 upon its peripheral portion which is disposed nearest to the center of disk 13 and shaft 12 is provided with an oblong recess 36, which effects collar 37 adjacent the termination of the discharging end 18 of each chute 16.

As drum 10 continues to be rotated in the direction indicated by arrows in Figs. 2, 5 and 6 after a pair of opposed chutes have received in their receiving ends 17 a number of potatoes through openings 19, 23 and 24 from hopper 21, as was hereinabove described, and after the potatoes have shifted from said receiving ends 17 to the discharging ends 18 of the said chutes 16, further shifting of drum 10 will bring said discharging ends 18 of chutes 16 to a vertical position, at which time some of the potatoes 22 will commence to fall out from the discharging ends 18 of chutes 16 through their recesses 36 spilling upon the bottom of drum 10 on each side of disk 13. As drum 10 continues to rotate said discharging ends 18 of chutes 16 will come out of vertical to inclined positions, indicated in Fig. 6, when all of potatoes 22 within the said discharging ends of the chutes, save one, or any other predetermined number, will spill out into the drum through recesses 36. That single one potato or any other predetermined number is prevented from spilling through recess 36 by virtue of collar 37 which forms a guard preventing that single one potato to follow the others into the drum. Of course, the open terminations of the discharging ends 18 of chutes 16 are blocked by the arcuate guard plate 20 during the rotary shifting movement of drum 10. By virtue of this arrangement that single one potato or any other predetermined number is retained within the discharging ends 18 of chutes 16, adjacent collars 37, and is carried farther until the discharging ends 18 of the chutes come in alinement with ejecting tube 33. When this occurs, there being no block of any sort preventing communication between the said discharging ends 18 of the chutes and said ejecting tubes 33, the retained potato or potatoes are discharged from said discharging ends 18 of the chutes and said ejecting tubes 33, as is indicated by the dotted lines, and the arrow, in Fig. 6.

The potatoes which have fallen upon the bottom of drum 10 through said recesses 36 are deflected by deflecting plates 38 towards the ends of said drum 10 to eventually find themselves in the end cages 39. Said end cages 39 include rings 40 which are of a diameter larger than the diameter of drum 10. Each section of said drum 10, on each side of recess 11, adjacent its outer end is provided with a radially disposed flange 41, to which one of said rings 40 is in any suitable manner rigidly affixed. The outer ends of spider 42 are rigidly connected with said rings 40, adjacent the inner rim of the latter, while the hub end of said spider 42 connects with collar 43. Each of said collars 43 is rigidly keyed to shaft 12 by means of pin 44. The round end wall 45 rigidly set upon collar 43 completes the structure of each cage 39. Said end walls 45 are each of a diameter corresponding to the diameter of rings 40.

The periphery of each cage 39 is completely opened. The arcuate guard wall 20 at its ends has extended diameters, as at 46 (Figs. 1, 4 and 8) to define stationary guards or bottoms for cages 39 as the latter rotate in unison with drum 10.

Rigidly affixed to rings 40 and the rim portions of each end wall 45 is a plurality of paddles 47, which are preferably on inclines relative to the diameters of said cages 39.

The inner wall of hopper 21 adjacent its ends is provided with offsets 48 for accommodating therewithin the rims of cages 39. Adjacent their upper edges said offsets 48 are recessed as at 49.

As drum 10 with cages 39 rotates any of the potatoes that have found their way to the bottom of said drum 10 eventually are shifted to cages 39 to repose upon the end portions 46 of guard plate 20. From there paddles 47 engage the potatoes, as is seen in Fig. 3, and carry the same in an upward direction, until the given paddles come in alinement with recesses 49 made in the offset portions 48 of the inner wall of hopper 21.

By virtue of the fact that said paddles 47 are at an incline, any potatoes pushed thereby will fall into hopper 21 when paddles 47 periodically come in the path of recess 49, as is clearly seen in Fig. 3. By virtue of the arrangement described only a single potato or any other number as predetermined by the length of collar 37 is permitted to fall out of ejecting tubes 33, while the excess of the potatoes which have fallen out of the discharging ends 18 of the several chutes as the same are carried by drum 10 past said ejecting tubes 33 are returned back to hopper 21.

Referring now more particularly to Fig. 8 the potato planter hereinabove described is carried rearwardly of tractor 50 or like machine. The planter is supported by a pair of frame bars 51 which by their forward ends are in rigid engagement with the rear end of tractor 50. Downwardly depending from said bars 51 are bearings 52 through which the ends of shaft 12 are extended and within which the same are supported for a rotary movement. Necessarily the ends of shaft 12 are cylindrical in transverse cross section. One of said ends of shaft 12 is extended for the purpose of having keyed thereto a pulley or the like over which an endless chain or belt 53 is extended. Another pulley or sprocket wheel is carried by shaft 54 which extends from said tractor 50 and from which motive power is derived for imparting a rotary movement to shaft 12 through the medium of belt or chain 53 for the purpose of imparting a rotary movement to shaft 12 and with it to drum 10 and cages 39. Rigidly carried by said bars 51 is a plurality of arms 55 rigidly connecting with guards 46 for maintaining the latter and guard plate 20 in a stationary relation. Since hopper 21 is rigidly connected with the upper ends of said guards 46 and guard plate 20 the former will also necessarily remain in a stationary relation relative to drum 10 and cages 39.

Supported in any suitable manner either upon said bars 51 or upon tractor 50 and ahead of the potato planter, that is intermediately of the rear end of tractor 50 and the potato planter, is a pair of plows 56 for the purpose of making a pair of ditches into which potatoes periodically passing from ejecting tubes 33 are deposited. Obviously said plows 56 should be in a longitudinal alinement with said ejecting tubes 33 as well as with discharging ends 18 of the several chutes 16. Rearwardly or past the planter supported upon bars 51 or by any other suitable means is a pair of levelers 57 for the purpose of filling ditches made by plows 56 with earth and covering the rows of potatoes as the latter fall into said ditches from ejecting tubes 33.

The planter herein disclosed made in miniature sizes may be quite well adapted for planting peas and beans.

It is further noted that as the potatoes are gradually exhausted in hopper 21 a new supply carried in or upon tractor 50 may be added to the hopper, or a storage receptacle carried by tractor 50 may be suitably connected with said hopper 21 for gradually filling said hopper 21 to replenish the potatoes therein.

It is noted that the object of springs 25 is to act as guards for preventing potatoes falling into drum 10 and for guiding the potatoes into openings 19 and the receiving ends 17 of chutes 16 when said springs 25 have shifted to their operative position shown in Fig. 5. Of course, the body portion of drum 10 keeps opening 24 in hopper 21 normally closed; said opening 24 acts as a passage for potatoes only when opening 23 comes in alinement with said opening 24, as is seen in Fig. 5.

It is further observed that although the planter illustrated in the drawings has only three chutes 16 on each side of disk 13, a larger number of said chutes may be provided. The greater the number of said chutes the more frequent supply of potatoes thereinto and their ejection therefrom will ensue, with the result that the distance of the ejected potatoes in the ditches made by plows 56 would be smaller than in the case where there is a lesser number of said chutes 16 in the planter. Of course, the diameters of disk 13 and hopper 10 with the resultant lengths of chutes 16 will be factors bearing upon the spaces between the planted potatoes.

The length of collar 37 substantially equal to the diameter of a single potato or the like determines the fact that only one single potato or the like is retained within the discharging end 18 of chute 16 to be carried by said collar 37 toward ejecting tube 33 and released thereinto through opening 35.

Although the drawings disclose pairs of chutes 16 capable of planting two rows of potatoes or the like, additional series of pairs of chutes 16 with cages 39 in alternate relation with said series may be set up for planting simultaneously a larger number of rows than two.

It is further observed that the planter, including drum 10, cages 39 as well as guard plate 20 and its offset end portions 46, are all supported above the ground. Optionally shaft 12 may be supported upon wheels. Motive power can be supplied to shaft 12 from the motor of tractor 50, as is contemplated by Fig. 8, or if preferred from the traction wheel or wheels of the tractor.

While there is described herein preferred embodiments of the present invention, it is nevertheless to be understood that minor changes may be made therein without departing from the spirit and scope of the invention as claimed.

What I claim as new is:

1. A seed planter comprising a rotatable drum, a transversely-extending seed chute mounted in said drum for rotation therewith and having an entrance end portion and an exit end portion, means for supplying a plurality of seeds to said entrance end portion of said chute during each revolution of said drum, said chute being so disposed within said drum as to deliver all of the seeds supplied thereto to the exit end portion of said chute during one revolution of said drum, seed discharge means near the bottom of said drum, said drum having an opening therein communicating with the exit end of said chute and cooperating with said seed discharge means when the exit end of said chute reaches a predetermined position near the bottom of the drum to discharge any seeds in said chute at that time, the exit end portion of said chute having a substantially tubular end zone extending inwardly from the wall of said drum a distance corresponding approximately to the thickness of the predetermined number of seeds to be discharged from said chute during each revolution and having an opening therein adjacent said tubular zone, said opening in said exit end portion of said chute being located on the lower side of said chute at a time prior to the time that the exit end of said chute reaches said predetermined discharging position, whereby seeds in excess of said predetermined number dorp out of said chute through said opening in said exit end portion into the interior of said drum.

2. A seed planter comprising a rotatable drum, a transversely-extending seed chute mounted in said drum for rotation therewith and having an entrance end portion and an exit end portion, a seed hopper for supplying a plurality of seeds to said entrance end portion of said chute during each revolution of said drum, comprising a yieldable closure carried by said drum, said yieldable closure being operable to alternately open and close a communication between the seed hopper and the entrance portion of the chute, said chute being so disposed within said drum as to deliver all of the seeds supplied thereto to the exit end portion of said chute during one revolution of said drum, seed discharge means near the bottom of said drum, said drum having an opening therein communicating with the exit end of said chute and cooperating with said seed discharge means when the exit end of said chute reaches a predetermined position near the bottom of the drum to discharge any seeds in said chute at that time, the exit end portion of said chute having a substantially tubular end zone extending inwardly from the wall of said drum a distance corresponding approximately to the thickness of the predetermined number of seeds to be discharged from said chute during each revolution and having an opening therein adjacent said tubular zone, said opening in said exit end portion of said chute being located on the lower side of said chute at a time prior to the time that the exit end of said chute reaches said predetermined discharging position, whereby seeds in excess of said predetermined number drop out of said chute through said opening in said exit end portion into the interior of said drum, and a cam in a stationary relation with said drum, said yieldable closure coming in contact with said cam once during each revolution of said drum at the time when said entrance end of the chute has approached said seed hopper for inducing shifting movement to said yieldable closure for the purpose of opening communication between said seed hopper and the entrance portion of the chute.

3. A seed planter comprising a rotatable drum, a transversely-extending seed chute mounted in said drum for rotation therewith and having an entrance end portion and an exit end portion, means for supplying a plurality of seeds to said entrance end portion of said chute during each revolution of said drum, said chute being so disposed within said drum as to deliver all of the seeds supplied thereto to the exit end portion of said chute during one revolution of said drum, seed discharge means near the bottom of said drum, said drum having an opening therein communicating with the exit end of said chute and cooperating with said seed discharge means when the exit end of said chute reaches a predetermined position near the bottom of the drum to discharge any seeds in said chute at that time, the exit end portion of said chute having a substantially tubular end zone extending inwardly from the wall of said drum a distance corresponding approximately to the thickness of the predetermined number of seeds to be discharged from said chute during each revolution and having an opening therein adjacent said tubular zone, said opening in said exit end portion of said chute being located on the lower side of said chute at a time prior to the time that the exit end of said chute reaches said predetermined discharging position and being arranged to permit seeds in excess of said predetermined number to drop out of said chute through said opening in said exit end portion into the interior of said drum, and means associated with the periphery of said drum to raise the seeds dropped into the interior of said drum and deposit them in a hopper from which they will return to the entrance end portion of the chute.

4. A seed planter comprising a rotatable drum, a transversely-extending seed chute mounted in said drum for rotation therewith and having an entrance end portion and an exit end portion, a seed hopper for supplying a plurality of seeds to said entrance end portion of said chute during each revolution of said drum comprising a yieldable closure carried by said drum, said yieldable closure being operable to alternately open and close a communication between the seed hopper and the entrance portion of the chute, said chute being so disposed within said drum as to deliver all of the seeds supplied thereto to the exit end portion of said chute during one revolution of said drum, seed discharge means near the bottom of said drum, said drum having an opening therein communicating with the exit end of said chute and cooperating with said seed discharge means when the exit end of said chute reaches a predetermined position near the bottom of the drum to discharge any seeds in said chute at that time, the exit end portion of said chute having a substantially tubular end zone extending inwardly from the wall of said drum a distance corresponding approximately to the thickness of the predetermined number of seeds to be discharged from said chute during each revolution and having an opening therein adjacent said tubular zone, said opening in said exit end portion of said chute being located on the lower side of said chute at a time prior to the time that the exit end of said chute reaches said predetermined discharging position and being arranged to permit seeds in excess of said predetermined number to drop out of said chute through said opening in said exit end portion into the interior of said drum, means associated with the periphery of said drum to raise the seeds dropped into the interior of said drum and deposit them in a hopper from which they will return to the entrance end portion of the chute, and a cam in a stationary relation with said drum, said yieldable closure coming in contact with said cam once during each revolution of said drum at the time when said entrance end of the chute has approached said seed hopper for inducing shifting movement to said yieldable closure for the purpose of opening communication between said seed hopper and the entrance portion of the chute.

References Cited in the file of this patent

UNITED STATES PATENTS

| | | |
|---|---|---|
| 408,585 | Coffin | Aug. 6, 1889 |
| 911,691 | Anderson | Feb. 9, 1909 |
| 1,127,520 | Rosen | Feb. 9, 1915 |
| 1,389,060 | Lippitz | Aug. 30, 1921 |
| 1,604,624 | White | Oct. 26, 1926 |
| 1,908,085 | Udvary et al. | May 9, 1933 |
| 2,341,265 | Crawford | Feb. 8, 1944 |
| 2,664,330 | Schupp | Dec. 29, 1953 |